United States Patent
Al Mahmood et al.

(10) Patent No.: US 11,983,165 B1
(45) Date of Patent: May 14, 2024

(54) LOAD HISTORY CALCULATION IN INTERNAL STAGE REPLICATION

(71) Applicant: Snowflake Inc., Bozeman, MT (US)

(72) Inventors: Abdullah Al Mahmood, Bothell, WA (US); Chong Han, Bellevue, WA (US); Ganeshan Ramachandran Iyer, Bellevue, WA (US); Jiaxing Liang, Bellevue, WA (US); Nithin Mahesh, Kirkland, WA (US); Yanrui Zhang, Mercer Island, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 18/128,212

(22) Filed: Mar. 29, 2023

(51) Int. Cl.
*G06F 16/23* (2019.01)
*G06F 16/174* (2019.01)
*G06F 16/27* (2019.01)

(52) U.S. Cl.
CPC ...... *G06F 16/2365* (2019.01); *G06F 16/1748* (2019.01); *G06F 16/27* (2019.01)

(58) Field of Classification Search
CPC .................................................. G06F 16/2365
See application file for complete search history.

(56) References Cited

U.S. PATENT DOCUMENTS

2021/0406310 A1 * 12/2021 Paulus ................ G06F 16/9017
2023/0401229 A1 * 12/2023 Gernhardt ............. G06F 16/256

* cited by examiner

*Primary Examiner* — Hau H Hoang
(74) *Attorney, Agent, or Firm* — WOMBLE BOND DICKINSON (US) LLP

(57) ABSTRACT

Embodiments of the present disclosure provide techniques for deduplicating files during internal stage replication using a directory table of the replicated internal stage that is modified as a cache for storing and retrieving original file-level metadata for the replicated files. An initial list of candidate files for loading from the internal stage to a table of the target deployment is prepared based on the files listed in the internal stage, and refined using a directory table lookup. If there is any inconsistency between the files registered in the directory table and the files listed in the internal stage, the target deployment will inspect the user-defined file-level metadata to obtain original file-level metadata for each file that is present in the internal stage but not in the directory table. This information may be used during deduplication to ensure that no duplicate files are loaded.

24 Claims, 7 Drawing Sheets

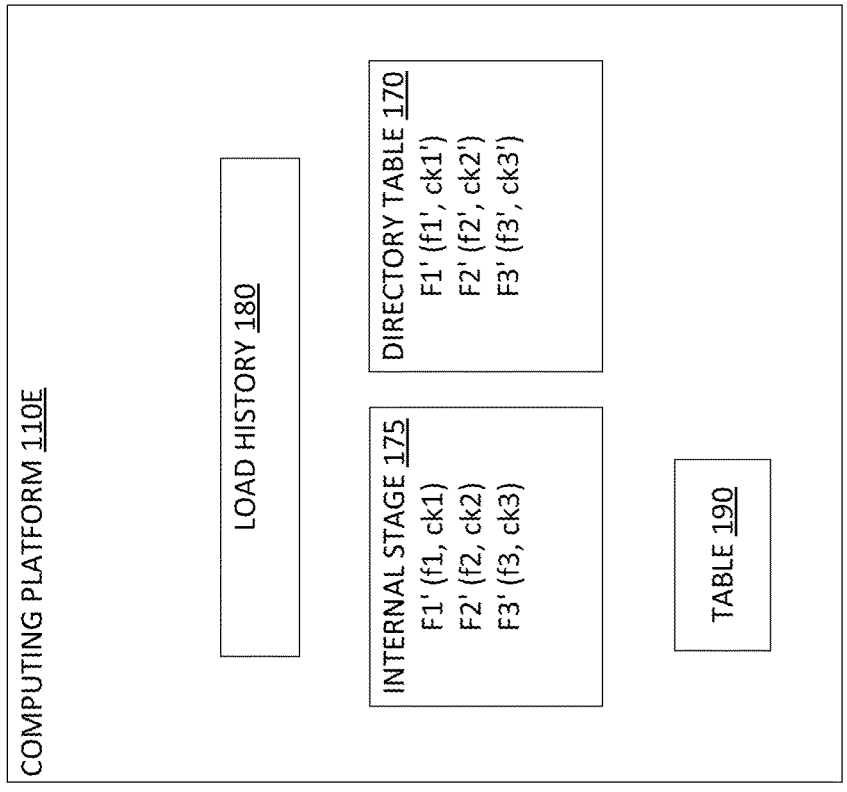
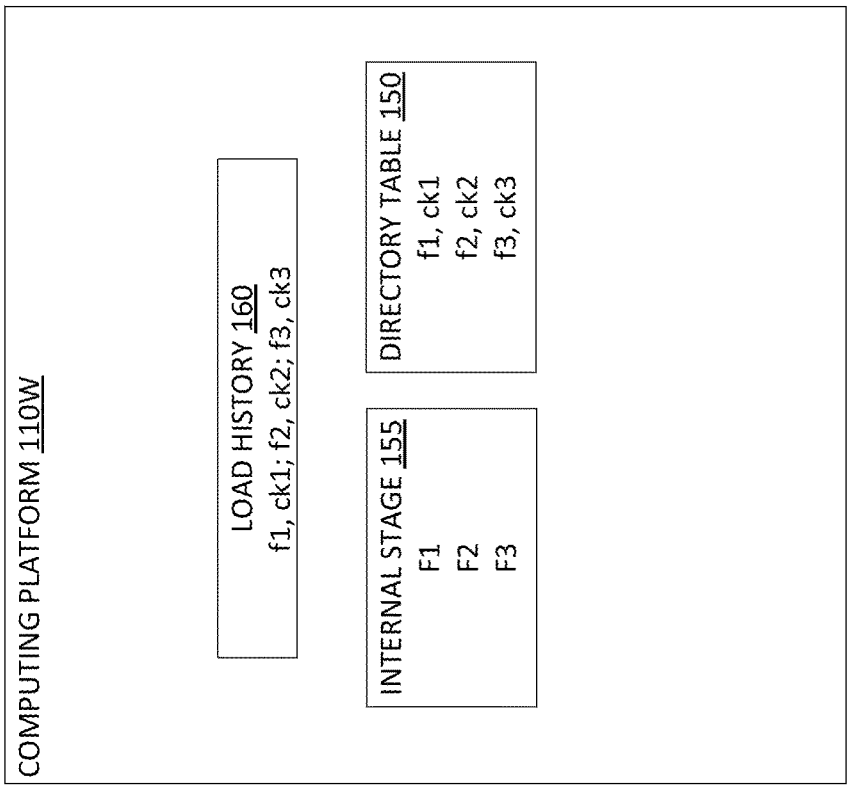
FIG. 2

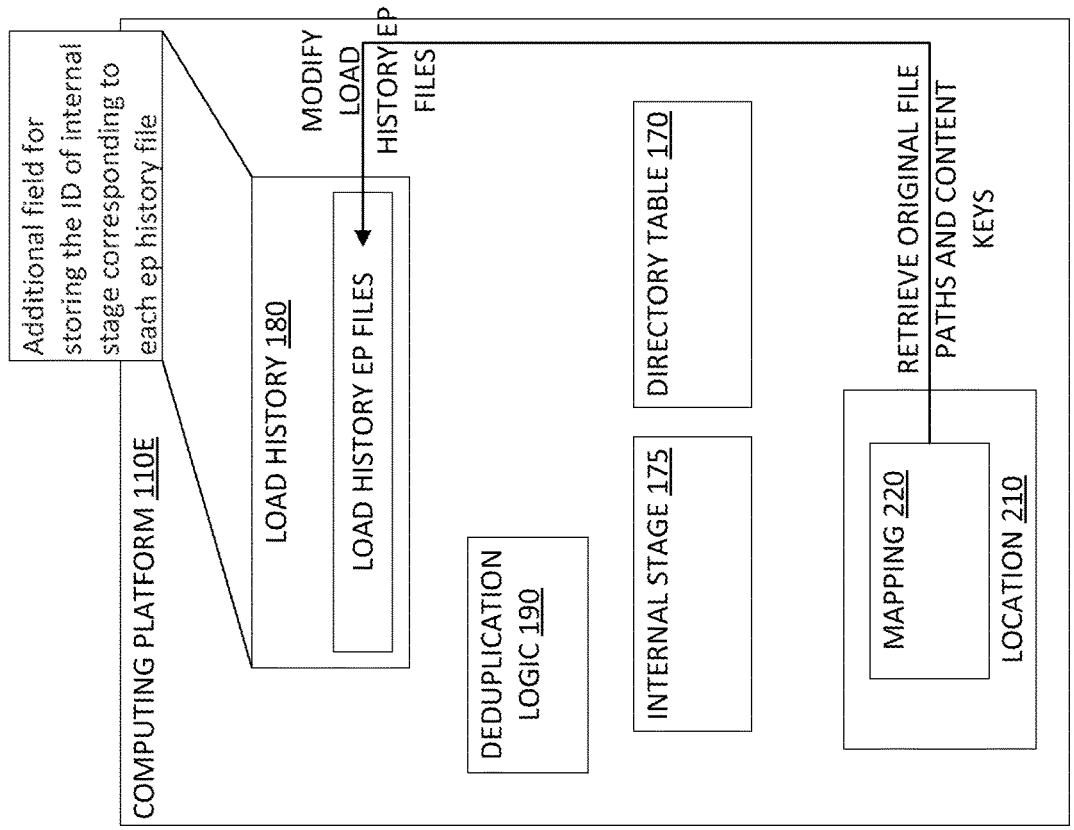
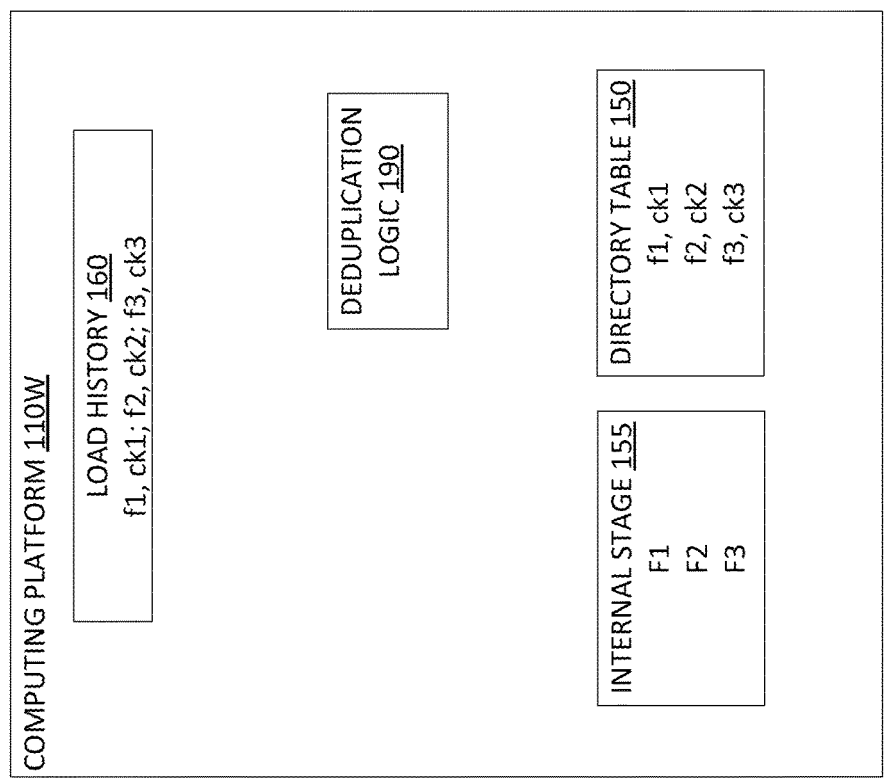
FIG. 5

LOAD HISTORY CALCULATION IN INTERNAL STAGE REPLICATION

TECHNICAL FIELD

The present disclosure relates to data sharing platforms, and particularly deduplication of files during replication of internal stages across deployments of a data sharing platform.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 2 is a block diagram of the cloud platform of FIG. 1 illustrating internal stage replication, in accordance with some embodiments of the present disclosure.

FIG. 5 is a block diagram of the cloud platform of FIG. 1 illustrating a deduplication operation using modified EP files, in accordance with some embodiments of the present disclosure.

DETAILED DESCRIPTION

Figure 1:
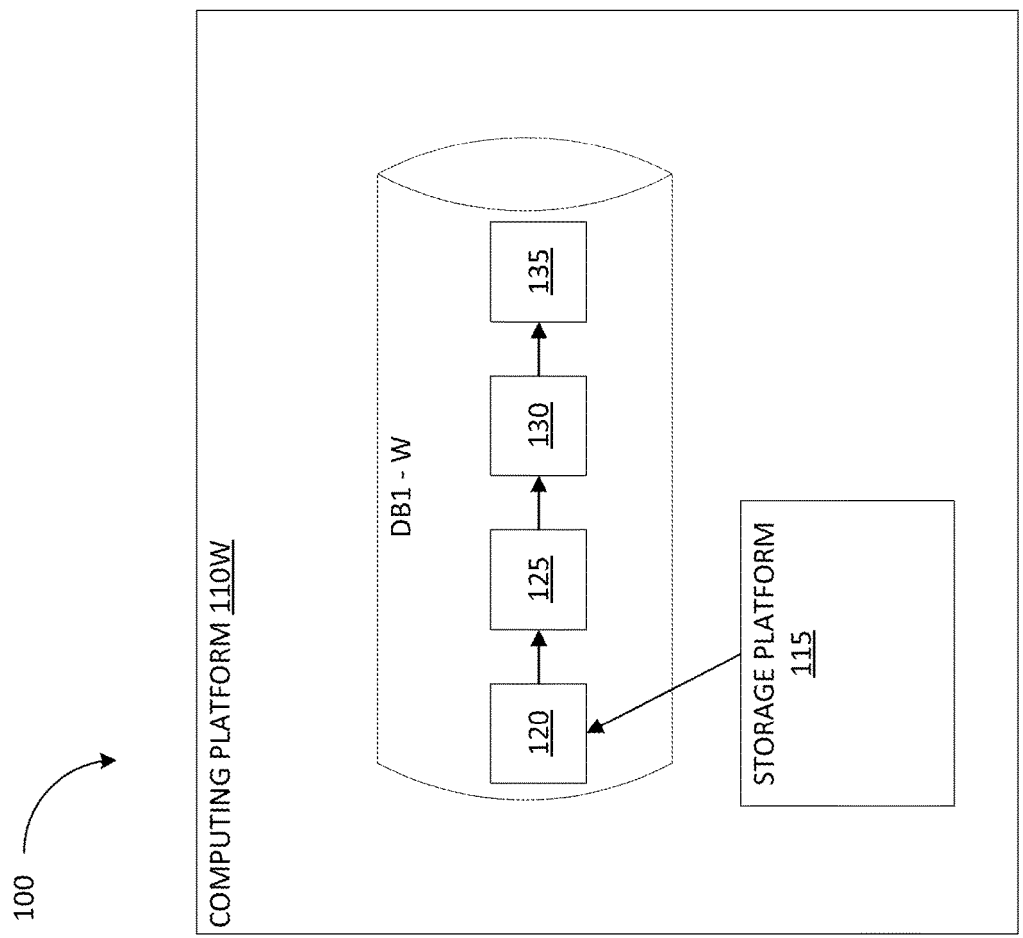
FIG. 1 is a block diagram of an example cloud platform, in accordance with some embodiments of the present disclosure.

Private and public data exchanges may allow data providers to more easily and securely share their data assets with other entities. A public data exchange (also referred to herein as a "Snowflake data marketplace," or a "data marketplace") may provide a centralized repository with open access where a data provider may publish and control live and read-only data sets to thousands of consumers. A private data exchange (also referred to herein as a "data exchange") may be under the data provider's brand, and the data provider may control who can gain access to it. The data exchange may be for internal use only, or may also be opened to consumers, partners, suppliers, or others. The data provider may control what data assets are listed as well as control who has access to which sets of data. This allows for a seamless way to discover and share data both within a data provider's organization and with its business partners.

The data exchange may be facilitated by a cloud computing service such as the SNOWFLAKE™ cloud computing service, and allows data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and to audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities, thus becoming a Data Supplier or Data Provider. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange (also referred to as a "data marketplace"), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Databases and schemas may be used to organize data stored in a data exchange and each database may belong to a single account within the data exchange. Each database may be thought of as a container having a classic folder hierarchy within it. Each database may be a logical grouping of schemas and a schema may be a logical grouping of database objects (tables, views, etc.). Each schema may belong to a single database. Together, a database and a schema may comprise a namespace. A stage is a location where data files are stored ("staged"), which helps with loading data into and unloading data out of a data exchange (e.g., loading data into and unloading data out of database tables). The stage locations could be internal or external to the data exchange environment. More specifically, stages may function as a folder (or "landing spot") that customers can put files into on their way into the data exchange during the ingestion phase of their data workflow. An internal stage may exist within a customer's data exchange account and as such, accessing an internal stage requires valid credentials.

Many organizations may wish to replicate their data warehouse cross-region (e.g., to different deployments of the computing platform) for disaster recovery and business continuity, as the data warehouse contains business critical data. In case of an outage at a first deployment of the computing platform, customers do not want to lose the business-critical data, and in case of an extended outage, they do not want to lose business continuity of analyzing that data. Therefore, organizations can replicate their data warehouses cross-region as well as switch their ETL and ingest workloads from one computing platform deployment to another.

Data exchanges may provide deduplication functionality, so that when an organization is performing data replication from one deployment of a data exchange to a target deployment of the data exchange, the deduplication functionality can prevent duplicate copies of files (i.e., files that are already within the target deployment) from being loaded and wasting storage space in the target deployment. When replicating files, if the data exchange determines that any of the replicated files are duplicative of files that have already been loaded by the target deployment, it may skip loading of those files and may only load replicated files that are determined to be new (i.e., not duplicative). There are a number of techniques that data exchanges may utilize in order to deduplicate files. For example, a data exchange may maintain metadata stores where metadata including a list of files ingested is stored. This metadata may include file path information that is used to perform various deduplication techniques.

However, the replication process can cause discrepancies in the file-level metadata of the replicated files. For example, when internal stage contents are replicated, the content key for the same file might not be the same. Indeed, if the source and destination deployments are on different clouds, the content key of the replicated file on the destination deployment will be different from the content key of the original file on the source deployment. In addition, in some scenarios, files that are copied to a target deployment during replication may be added to an internal stage on the target deployment but may not get registered in the directory table of the target deployment. Such a file will have no record in the directory table of the target deployment, and as a result if the target deployment attempts to list the file, it will return a local file path and content key (i.e., local file-level metadata) corresponding to the target deployment since the target deployment will treat the leaked file as if it were created as a new file in the target deployment itself. This in turn results in a high risk of such files being duplicative manner since the target deployment will not have the correct metadata for the file and thus metadata-based deduplication techniques will not work.

Embodiments of the present disclosure overcome the above and other issues by using the directory table on the internal stage of the target deployment as a cache for storing and retrieving the original file-level metadata (original file path, original content key etc.) for the replicated files. The directory table may be modified with additional metadata columns to store the original file-level metadata of each replicated file. The way the initial list of candidate files for loading from the internal stage of the target deployment is prepared is modified so that the target deployment will first generate the initial list of candidate files from the internal stage, and then use the directory table to refine the initial list of candidate files. Then, depending on whether there is any inconsistency between the files listed in the directory table and the files listed in the internal stage, the target deployment will inspect the user-defined file-level metadata of the internal stage to obtain the original file-level metadata for each file that is present in the internal stage but not in the directory table. This information may be used during deduplication to ensure that no duplicate files are loaded.

FIG. 1 is a block diagram of a cloud platform 100 in which the systems and methods described herein may be implemented. The cloud platform 100 may comprise any appropriate cloud data lake (or similar cloud system) such as the Amazon Web Services (AWS) platform, Microsoft's Azure platform, or the Google Cloud platform, for example. The cloud platform 100 may comprise a computing platform 110W (which may be a first deployment of the cloud platform 100) and a computing platform 110E (which may be a second deployment of the cloud platform 100).

The computing platforms 110W and 110E may be coupled to each other (e.g., may be operatively coupled, communicatively coupled, may communicate data/messages with each other) via a network (not shown). The network may be a public network (e.g., the internet), a private network (e.g., a local area network (LAN) or wide area network (WAN)), or a combination thereof. In one embodiment, network may include a wired or a wireless infrastructure, which may be provided by one or more wireless communications systems, such as a WiFi™ hotspot connected with the network and/or a wireless carrier system that can be implemented using various data processing equipment, communication towers (e.g. cell towers), etc. In some embodiments, the network may be an L3 network. The network may carry communications (e.g., data, message, packets, frames, etc.) between computing platform 110W and computing platform 110E. Each computing platform 110W and 110E may include hardware (not shown) such as processing devices (e.g., processors, central processing units (CPUs)), memory (e.g., random access memory (e.g., RAM)), storage devices (e.g., hard-disk drive (HDD), solid-state drive (SSD), etc.—not shown), and other hardware devices (e.g., sound card, video card, etc.—not shown). In some embodiments, the memory may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The memory may be configured for long-term storage of data and may retain data between power on/off cycles of the computing platform 110W. Each computing device may comprise any suitable type of computing device or machine that has a programmable processor including, for example, server computers, desktop computers, laptop computers, tablet computers, smartphones, set-top boxes, etc. In some examples, each of the computing platforms 110W and 110E may comprise a single machine or may include multiple interconnected machines (e.g., multiple servers configured in a cluster). The computing platforms 110W and 110E may be implemented by a common entity/organization or may be implemented by different entities/organizations. For example, computing platform 110W may be operated by a first company/corporation and one or more computing platform 110E may be operated by a second company/corporation. Each of computing platform 110W and computing platform 110E may execute or include an operating system (OS). The host OS of a computing platform 110W and 110E may manage the execution of other components (e.g., software, applications, etc.) and/or may manage access to the hardware (e.g., processors, memory, storage devices etc.) of the computing device. In some embodiments, each of computing platform 110W and computing platform 110E may comprise a deployment of a cloud data platform or data exchange.

As discussed herein, many organizations may wish to replicate their data warehouse cross-region (e.g., to different deployments of the computing platform) for disaster recovery and business continuity, as the data warehouse contains business critical data. In case of an outage at a first deployment of the computing platform, customers do not want to lose the business-critical data, and in case of an extended outage, they do not want to lose business continuity of analyzing that data. Thus, the computing platform 110W may provide for database replication of DB1-W, which may be referred to as a primary database. Any number of databases in an account can be designated a primary database. Likewise, a primary database can be replicated to any number of accounts in an organization. This involves creating a secondary database as a replica of a specified primary database in each of the target accounts. These accounts are typically located in other regions, on the same or a different cloud platform.

FIG. 1 also illustrates a storage platform 115, which may facilitate the storing of data on the cloud platform 100 and may comprise an appropriate object storage service such as e.g., the Amazon S3 service to store data and query results on the cloud platform 100. The storage platform 115 may comprise multiple buckets (databases—not shown). In the example of FIG. 1, data on storage platform 115 may be distributed across these buckets. The computing platform 110W may provide database DB1-W which may represent a data warehouse that provides a single, governed, and immediately queryable source for all of the data on cloud platform 100. The computing platform 110W (via DB1-W) may facilitate data management and access functionality as well as data analysis functions (e.g., SQL queries, analysis) and other computation capabilities (e.g., secure data sharing between users of the cloud platform 100). Cloud platform 100 is shown in FIG. 1 with two deployments but may have any appropriate number of deployments.

Before ingesting data from storage platform 115 into a table in in the database DB1-W, the data may be loaded into an internal stage 120 using a command (e.g., a "PUT" command). The internal stage 120 may be any appropriate type of internal stage such as a user stage, which is a type of internal stage that is personal to the customer, and thus no other customer else can see them. By default, each customer is assigned a user stage, which cannot be modified or removed. The data may then be loaded into the table 125 using a command (e.g., a "COPY INTO" command). The customer may perform processing of the data as desired and unload the data to a target table 130. The processed data is to be unloaded from the target table 130 into the internal stage 135 using a command (e.g., the "COPY INTO" command). The internal stage 135 may be any appropriate type of internal stage such as a table stage, which is an internal stage that is tied to a specific user. Whenever a table is created, a table stage is automatically created. Similar to a user stage, a table stage cannot be modified or removed. The internal stage 135 may also be a named stage, which is a storage location object and as such any operations that can be performed on objects can be performed on named stages as well. Since they are database objects, named stages are subject to the same security permissions as other database objects. The processed data may be unloaded from the internal stage 135 and copied into the local system 115 using a command such as e.g., the "GET" command.

FIG. 2 illustrates a database replication operation. As shown, the computing platform 110W may include directory table 150, internal stage 155 and load history 160. The internal stage 155 may include a set of files F1, F2 and F3. Directory tables store a catalog of staged files in cloud storage. A directory table is not a separate database object but rather, is an implicit object layered on a stage (e.g., an internal stage). A directory table may store file-level metadata about the files in a stage which can be queried. Such file-level metadata may include the file path (e.g., URL) of each file and a content key (e.g., ETag or md5 depending on the cloud provider) of each file, which may be used for deduplication. In some embodiments, the file-level metadata of a file may further include the storage type, among other information. The directory table 150 may store file-level metadata (e.g., f1, ck1 corresponding to the file path and content key respectively of file F1) for each file F1, F2 and F3. The load history 160 may include an EP file for each file F1, F2 and F3, where the EP file for a file includes the file level metadata of the file.

The computing platform 110E may trigger a refresh command, thereby generating an inventory comprising a list of entities in the computing platform 110E and also the candidate entities that need to be replicated later. The computing platform 110E may send this inventory to the computing platform 110W. When the computing platform 110W receives the inventory, it may generate a snapshot based on the inventory. The snapshot may include all entities, their EP files and their FDN files if there are any. The snapshot may include an internal stage DPO (not shown) corresponding to internal stage 155, a directory table DPO (not shown) corresponding to directory table 150, and a stage location DPO (not shown). The computing platform 110W may transmit the snapshot to computing platform 110E. Upon receiving the snapshot, computing platform 110E may analyze the snapshot and sync the snapshot with the entities currently in the computing platform 110E based on the parent-child order, i.e., database, schema, table/stage, then grants/columns etc. The sync process may cover 3 cases: entities in computing platform 110W, but not in computing platform 110E, which leads to a CREATE operation; entities that are not in computing platform 110W, but are in computing platform 110E, which leads to a DELETE operation; and entities are in both computing platform 110W and computing platform 110E, which leads to an UPDATE operation.

The replication process may result in directory table 150, internal stage 155, and load history 160 being replicated to computing platform 110E, resulting in directory table 170, internal stage 175 and load history 180 respectively. As shown, the internal stage 175 may include replicated files F1', F2' and F3'. As part of the replication process, the computing platform 110W may embed user-defined file-level metadata within the files F1, F2, and F3 (e.g., (f1, ck1), (f2, ck2), (f3, ck3)). This user-defined metadata may be replicated to the internal stage 175 as well and may serve as an ultimate source of truth regarding the original file-level metadata of the replicated files. The replication of the content of internal stage 155 will be finished when files that are not duplicates are loaded into e.g., the table 190. This deduplication and loading may be performed as part of a copy operation of the computing platform 110E. Upon execution of the copy operation, the computing platform 110E may prepare an initial list of candidate files that should be considered for loading into table 190. The initial list of candidate files is prepared either by listing all the files in the internal stage 175 or by making a call for each file to the remote storage provider. Then the computing platform 110E may look up the load history 180 for applying the deduplication logic and prepare a filtered (final) list of candidate files for loading and attempt to load those files.

However, the replication process can cause discrepancies in the file-level metadata of the replicated files. For example, when internal stage contents are replicated, the content key for the same file might not be the same. Indeed, if the source and destination deployments are on different clouds, the content key of the replicated file on the destination deployment will be different from the content key of the original file on the source deployment. Even if the source and destination are on the same cloud, the use of client-side encryption means the encryption keys are different between the two deployments, and thus the content key may be different. As a result, there is a possibility of duplicate loading the same file after failing over to computing platform 110E as the same file might appear to be a new file. Indeed, as shown in FIG. 2 the replicated directory table 170 will store the local file-level metadata (f1', ck1'), (f2', ck2'), (f3', ck3') (corresponding to the computing platform 110E) for the replicated files F1', F2' and F3' instead of their original file-level metadata.

In addition, in some scenarios, files that are copied to computing platform 110E during replication may be added to the internal stage 175 but may not get registered in the directory table 170. Such files may be referred to as leaked files. Files may leak due to missing atomicity of stage and directory table synchronization in the computing platform 110E. During internal stage replication, the order of synchronization is stage DPO synchronization, directory DPO synchronization, files are copied to the internal stage 175, and then the content of the directory tables 150 and 170 is synchronized. However, a refresh of the directory table 170 can fail or be canceled after files are copied to the internal stage 175 but before the directory table 170 registers those files. As a result, a leaked file will have no record in the directory table 170 (and thus, no record in the additional column 171), and if the computing platform 110E attempts to list the leaked file, it will return local file-level metadata (local file path and content key) corresponding to the computing platform 110E since the computing platform 110E will treat the leaked file as if it were created as a new file in the computing platform 110E itself. Such leaked files can only be present until the first refresh of the directory table 170 after a failover. During the first refresh, the computing platform 110E may register leaked files in the directory table 170 using the local file-level metadata of the computing platform 110E. As a result, the directory table 170 will have incorrect file-level metadata about such leaked files because the original file-level metadata of these files (i.e., the original file path and content key corresponding to the source deployment/computing platform 110W) will be permanently lost because of the refresh of the directory table 170. As a result, such leaked files are also at high risk of being duplicate loaded.

Figure 3:
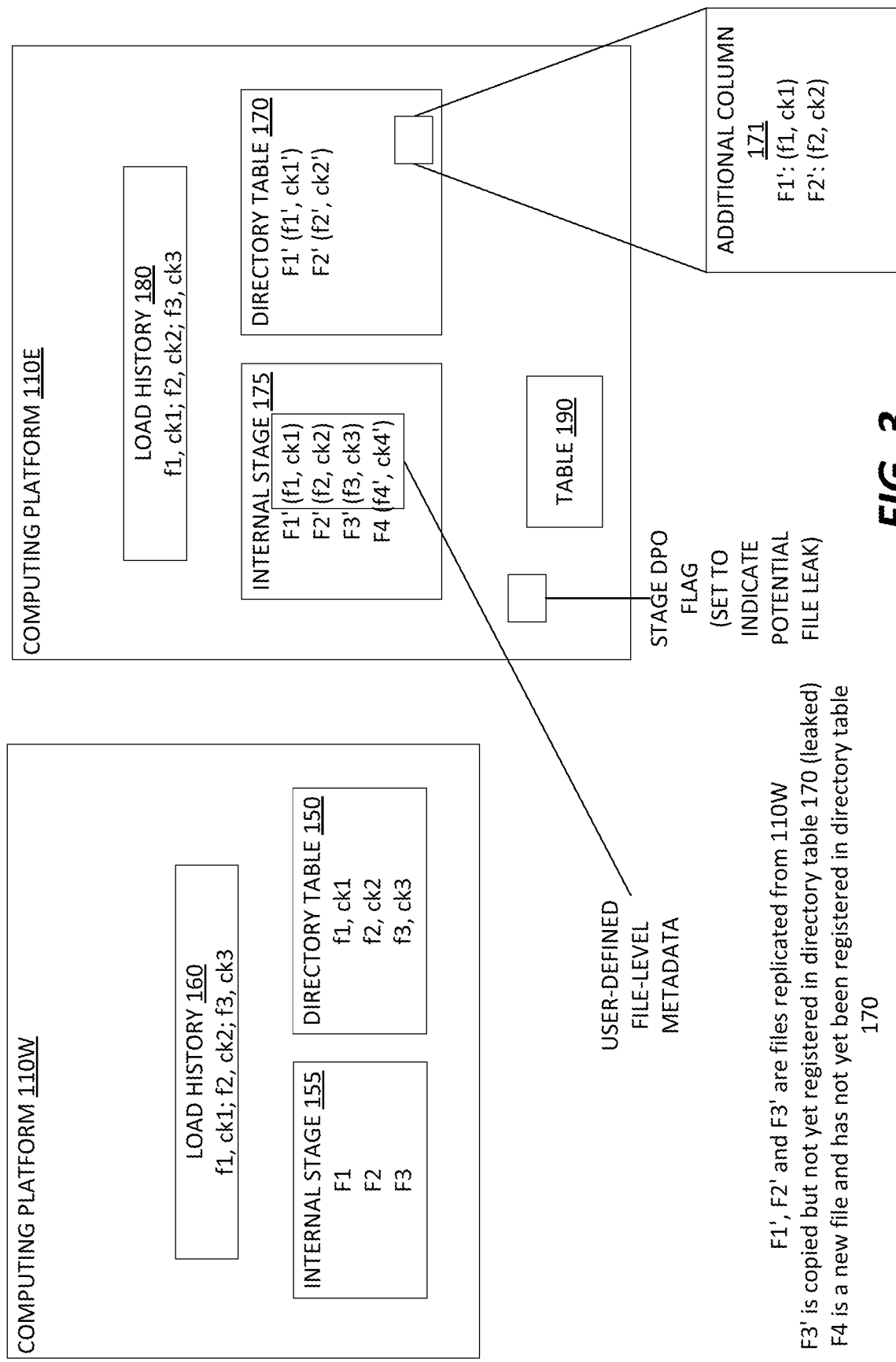
FIG. 3 is a block diagram of the cloud platform of FIG. 1 illustrating a deduplication operation using a modified directory table, in accordance with some embodiments of the present disclosure.

Embodiments of the present disclosure address these and other problems by using the directory table 170 on the internal stage 175 as a cache for storing and retrieving the original file-level metadata (original file path, original content key etc.) for the replicated files within the internal stage 175 as shown in FIG. 3. The directory table 170 may be modified with an additional metadata column 171 (hereinafter referred to as "additional column 171") that is dedicated to storing original file-level metadata (original file path and original content key) of each new file within the internal stage 175. The way the initial list of candidate files for loading from internal stage 175 (e.g., to table 190) is prepared is modified so that the computing platform 110E will first generate the initial list of candidate files from the internal stage 175, and then use the directory table 170 and its additional column 171 to refine the initial list of candidate files (as discussed in further detail herein). It should be noted that the initial list of candidate files may comprise the file-level metadata for each of the candidate files that is available from the directory table 170 at the time the initial list is prepared. Stated differently, each file in the initial list of candidate files may be identified by their file-level metadata. Then, depending on whether there is any inconsistency between the files listed in the directory table 170 and the files listed in the internal stage 175 (as discussed in further detail herein), the computing platform 110E will inspect the user-defined file-level metadata replicated to the internal stage 175 to obtain the original file-level metadata for each file that is present in the internal stage 175 but not in the directory table 170. This information may be used during deduplication to ensure that no duplicate files are loaded during the copy operation as discussed in further detail herein.

It should be noted that although the user-defined file-level metadata within the internal stage 175 may serve as the ultimate source of truth regarding the original file-level metadata, inspecting the user-defined file-level metadata within the internal stage 175 is a resource intensive operation. By using the directory table 170 as a cache to store the original file-level metadata and avoiding having to inspect the user-defined file-level metadata whenever possible (i.e., as long as the files listed in the directory table 170 are not inconsistent with the files listed in the internal stage 175), the replication operation can be completed in a more resource efficient manner.

In the example of FIG. 3, as files F1, F2, and F3 are files replicated from computing platform 110W to computing platform 110E, the computing platform 110W may embed user-defined file-level metadata within in the files F1, F2, and F3 (e.g., (f1, ck1), (f2, ck2), (f3, ck3)). This user-defined metadata may be replicated to the internal stage 175 along with the files F1, F2, and F3 and may serve as an ultimate source of truth regarding the original file-level metadata of the replicated files. Stated differently, files F1', F2' and F3' stored in the internal stage 175 may also include this use-defined file-level metadata. Files F1', F2' have been replicated and registered with the directory table 170 and file F3' has been replicated but not yet registered in the directory table 170 (i.e., has leaked). File F4 is a new file created in computing platform 110E and has not yet been registered in directory table 170. As shown in FIG. 3, the directory table 170 may be modified to include an additional column 171 for storing the original file-level metadata (e.g., original file path and original content key) of each new file. The additional column 171 may comprise a single variant column to contain all the required original file-level metadata. However, in some embodiments the additional column 171 may comprise multiple columns, each dedicated to storing a particular aspect of the original file-level metadata. For files that are replicated to computing platform 110E, the additional column 171 will be populated with the original file-level metadata from the source deployment (e.g., computing platform 110W). More specifically, during internal stage content replication, the computing platform 110E may store the original file-level metadata of each file being replicated as user-defined object metadata within the additional column 171. For new files that are created on computing platform 110E (i.e., files that were not replicated to computing platform 110E), the original file-level metadata stored in the additional column 171 will be the same as the local (e.g., computing platform 110E) file-level metadata. As can be seen in FIG. 3, (f1', ck1') indicates the local file path and content key respectively for replicated file F1' and not the original file path and content key (which should be f1, ck1 respectively). Because files F1' and F2' have been registered with the directory table 170, their local file-level metadata ((f1', ck1') and (f2', ck2') respectively) is stored in the normal column of directory table 170 and their original file-level metadata ((f1, ck1) and (f2, ck2) respectively) has been stored in the additional column 171 of the directory table 170. Because files F3' and F4 have not yet been registered in the directory table 170, the directory table 170 contains none of their file-level metadata (whether original or local).

During the deduplication phase of the copy operation, the computing platform 110E may prepare the initial list of candidate files to be loaded to the table 190 based on the files listed in the internal stage 175 and a directory table 170 lookup as discussed in further detail herein. After determining the initial list of candidate files to be loaded based on the contents of the internal stage 175 and the contents of the directory table 170, the computing platform 110E may determine whether the list of files registered in the directory table 170 is inconsistent with the files listed in the internal stage 175.

The stage DPO (not shown) of computing platform 110E may include an inconsistency flag (hereinafter referred to as a "Stage DPO flag") which may be set after the first refresh of the directory table 170 after a failover as discussed hereinabove. The Stage DPO flag may be used by the computing platform 110E to determine whether the files registered with the directory table 170 are inconsistent with the files listed in the internal stage 175 (i.e., the reliability of the directory table 170). When the Stage DPO flag is not set, the computing platform 110E may know that the files registered with the directory table 170 are consistent with the files listed in the internal stage 175 (because none of the original file-level metadata has been lost to a refresh) and the copy operation can use the directory table 170 to generate the final list of candidate files to be loaded. If the Stage DPO flag is set, the computing platform 110E may determine that a first refresh of the directory table 170 has occurred after a failover which indicates that there are potentially leaked files (i.e., the files registered with the directory table 170 are potentially inconsistent with the files listed in the internal stage 175) and that a refresh of the directory table 170 is needed to make the directory table 170 and the internal stage 175 consistent.

If the Stage DPO flag is set, it will remain set until the subsequent refresh of the directory table 170. For copy queries loading from the internal stage 175 while the Stage DPO flag is set and before the subsequent refresh of the directory table 170, the computing platform 110E will inspect the user-defined file-level metadata from the internal stage 175 to obtain the original file-level metadata for each file of the initial list of candidate files that is present in the internal stage 175 but not in the directory table 170. The computing platform 110E may modify the file descriptors for each file of the initial list of candidate files that is present in the internal stage 175 but not in the directory table 170 by replacing the local file-level metadata with the original file-level metadata obtained from the internal stage 175 to generate the final list of candidate files to be loaded. The computing platform 110E may then perform deduplication using the final list of candidate files and the load history 180.

During the subsequent refresh of the directory table 170, for each file that is present in the internal stage 175 but not in the directory table 170, the computing platform 110E may inspect the corresponding user-defined file-level metadata from the internal stage 175 and use it to update the corresponding entry of the additional column 171 by replacing the local file-level metadata with the original file-level metadata obtained from the internal stage 175. The Stage DPO flag may then be unset and for copy queries loading from the internal stage 175, the computing platform 110E can use the directory table 170 to generate the final list of candidate files to be loaded.

In some embodiments, instead of a flag, the Stage DPO may provide for a timestamp of a first refresh after a failover to be stored. In such embodiments, when determining whether the contents of the directory table 170 are consistent with the internal stage 175, the computing platform 110E may determine whether a first refresh time stamp has been set in the Stage DPO (not shown). If no timestamp has been set, the computing platform 110E may know that the contents of the directory table 170 is consistent with the internal stage 175 and the copy operation can use the directory table 170 to generate the list of candidate files to be loaded. If a timestamp is set, the computing platform 110E may determine that a first refresh has occurred after a failover and thus that there are potentially leaked files. As a result, the computing platform 110E will be required to inspect the user-defined file-level metadata from the internal stage 175 for each file that is present in the internal stage 175 but not in the directory table 170 until the subsequent refresh of the directory table 170, as discussed above.

At this point, the computing platform 110E may perform standard deduplication techniques (e.g., using the load history 180) on the final list of candidate files to determine which files from the final list should be loaded into table 190. It should be noted that this approach may incur potentially long file listing times that result in copy performance degradation for a number of copy queries. However, it allows the system to ensure that the copy behavior remains consistent.

In the example of FIG. 3, files F1', F2' and F3' are files replicated from 110W and file F3' has been replicated but not yet registered in directory table 170 (i.e., has leaked). File F4 is a new file created in computing platform 110E and has not yet been registered in directory table 170. In FIG. 3, (f1', ck1') indicates the local file-level metadata for replicated file F1' and not the original file-level metadata (which should be f1, ck1 respectively). Because F1' and F2' have been registered with the directory table 170, their local file-level metadata ((f1', ck1'), (f2', ck2') respectively) is stored in the normal column of the directory table 170 and their original file-level metadata ((f1, ck1) and (f2, ck2) respectively) may be stored in the additional column 171 of the directory table 170. When the computing platform 110E executes a copy operation, it may first prepare the initial list of candidate files based on the files listed in the internal stage 170 resulting in an initial list of candidate files (identified by their file-level metadata) including (f1', ck1'), (f2', ck2'), (f3', ck3'), (f4', ck4'). This is because the initial list of candidate files is first prepared based on the files in the internal stage 175 (without a lookup of the user-defined file-level metadata), resulting in the local file-level metadata for each file F1', F2', F3' and F4 being listed. After performing a lookup using the directory table 170, the initial list of candidate files would be changed to (f1, ck1), (f2, ck2), (f3', ck3'), (f4', ck4'). This is because files F1' and F2' were registered, so their original file-level metadata is stored in the additional column 171 of directory table 170. However, because file F3' was never registered (and in this example a first refresh after a failover has occurred), the local file-level metadata given to it upon replication is returned since the computing platform 110E will treat F3' (leaked file) as if it were created as a new file in the computing platform 110E itself. File F4 is a new file and so its source deployment is computing platform 110E, therefore the local file-level metadata given to it upon its creation is correct. At this point the initial list of candidate files has incorrect file-level metadata about file F3' and completion of the copy operation would result in a duplicate loading of the file F3'.

However, the computing platform 110E may check the Stage DPO flag (which in the example of FIG. 3 has been set) and determine the presence of potential leaked files in the internal stage 175. Thus, the computing platform 110E may inspect the user-defined file-level metadata from the internal stage 175 for each file of the initial list of candidate files that is present in the internal stage 175 but not in the directory table 170 (F3' and F4) to obtain the corresponding original file-level metadata ((f3, ck3) and (f4, ck4) respectively). The computing platform 110E may then update the file descriptor for file F3' in the initial list of candidate files with the original file-level metadata (f3, ck3). The computing platform 110E may determine that the file descriptor for file F4 (f4', ck4') is already correct and generate a final list of candidate files to load that includes (f1, ck1), (f2, ck2), (f3, ck3), and (f4', ck4'). At this point the computing platform 110E may perform a load history EP file look up (using load history 180) on the final list of candidate files to determine the list of loadable files as F4 since (f4', ck4') is not present in the load history 180. It should be noted that the Example of FIG. 3 assumes that a subsequent refresh of the directory table 170 has not yet happened.

Figure 4:
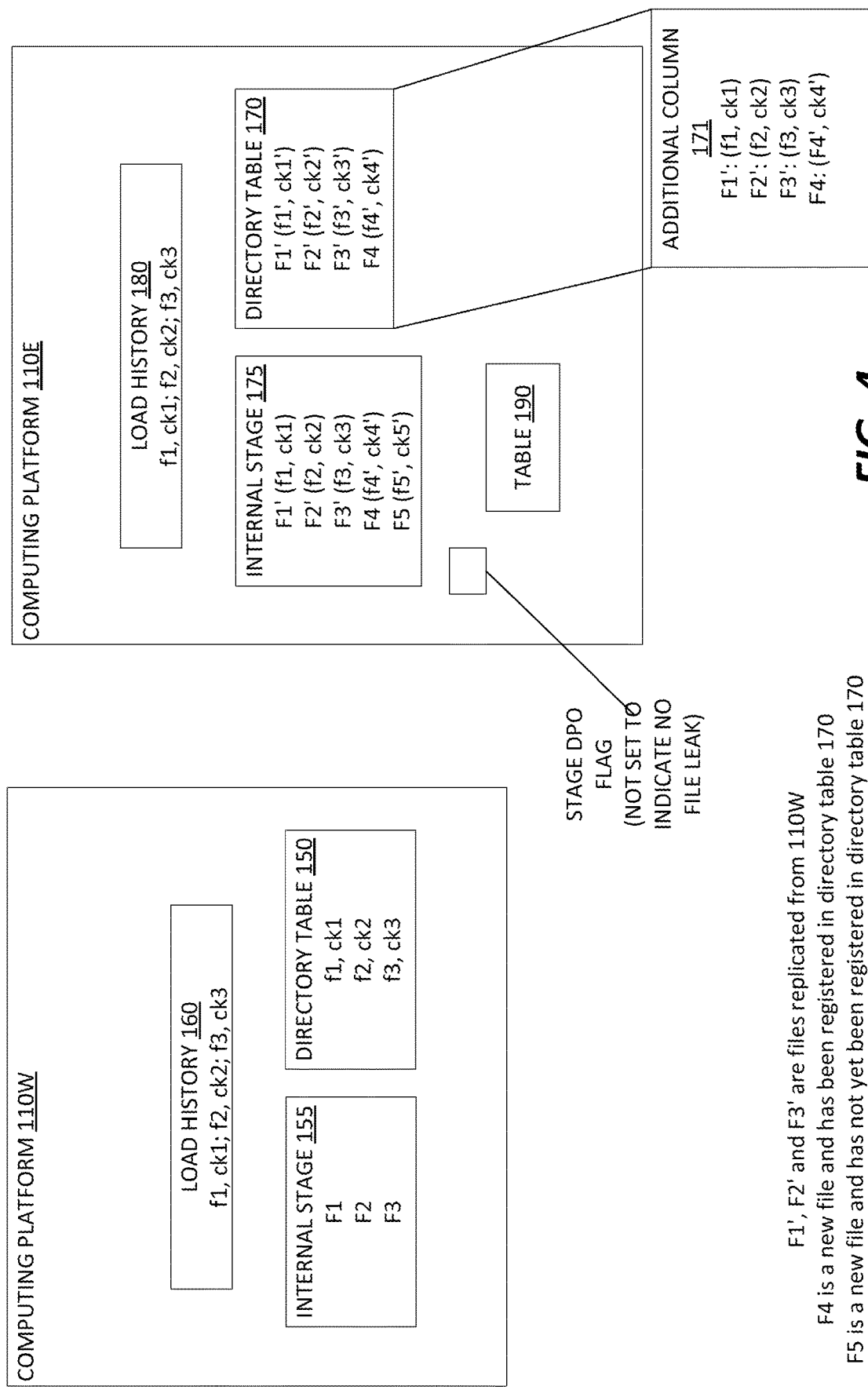
FIG. 4 is a block diagram of the cloud platform of FIG. 1 illustrating a deduplication operation using a modified directory table, in accordance with some embodiments of the present disclosure.

FIG. 4 illustrates another example scenario. In the example of FIG. 4, files F1', F2' and F3' are files replicated from 110W. File F4 is a new file created in computing platform 110E and has been registered in directory table 170. File F5 is a new file created in computing platform 110E and has not yet been registered in directory table 170. When the computing platform 110E executes a copy operation, it may first prepare the initial list of candidate files based on the files listed in the internal stage 170 resulting in an initial list of candidate files (identified by their file-level metadata) including (f1', ck1'), (f2', ck2'), (f3', ck3'), (f4', ck4'), (f5', ck5'). After performing a lookup using the directory table 170, the initial list of candidate files would be changed to (f1, ck1), (f2, ck2), (f3, ck3), (f4', ck4'), (f5', ck5'). File F4 is a new file that has been registered and so its source deployment is computing platform 110E. Thus, the local file-level metadata given to it upon its creation is correct and matches the local file-level metadata registered in directory table 170. File F5 is a new file and so its source deployment is computing platform 110E. Thus, although it is not registered, the local file-level metadata given to it upon its creation is correct. The computing platform 110E may check the Stage DPO flag (which in this example has not been set) and determine that the list of files registered with the directory table 170 is consistent with the files in the internal stage 175 and thus the initial list of candidate files based on the directory table 170 lookup is correct (i.e., corresponds to the final list of candidate files). The computing platform 110E may perform a load history EP file look up using the load history 180 on the final list of candidate files to determine the list of loadable files as F4 and F5 since (f4', ck4') and (f5', ck5') are not present in the load history 180. Note that there were no leaked files in the internal stage 175 and so the computing platform 110E did not incur any performance degradation from inspecting original file-level metadata from the internal stage 175. Although F5 is a file that exists in the internal stage 175 but not in the directory table 170, it is a new file created in computing platform 110E and so inspecting the internal stage 175 for original file-level metadata is unnecessary.

The present disclosure also relates to providing enhanced deduplication by utilizing the load history EP files themselves to provide the original file-level metadata (instead of a modified directory table 170 with additional columns 171 for original file-level metadata). In some embodiments, during replication, the computing platform 110E may modify the load history EP files of externally originating files by replacing local file-level metadata with the original file-level metadata.

FIG. 5 illustrates one embodiment involving utilizing the load history EP files themselves to provide the original file-level metadata, where the internal stage 155 and its contents are replicated before any tables and corresponding load history EP files. The replication logic 190 may maintain a mapping 220 of local file-level metadata to original file-level metadata for each file that is replicated (also referred to herein as externally originating file) to internal stage 175 in a location 210 that is identifiable by the internal stage 175. The location 210 may be any appropriate location such as a location in an object storage service (e.g., an Amazon™ S3™ bucket). Although the example of FIG. 5 is illustrated with a single internal stage 175, this is for ease of illustration and computing platform 110E may have any appropriate number of internal stages. For each internal stage, the replication logic 190 may create a file in the location 210 which will contain a mapping of local file-level metadata to original file-level metadata for each corresponding file that is replicated to that internal stage. The replication logic 190 may modify each of the EP files in the load history 180 to include an additional field for storing an internal stage ID of the internal stage to which the corresponding externally originating file is replicated (i.e., to associate the externally originating file with its corresponding internal stage).

During internal stage content replication for the internal stage 175, the replication logic 190 may check if the mapping 220 has been created already and if not, the replication logic 190 may create the mapping 220 and keep a record of the mapping in the local metadata storage of the computing platform 110E. However, there are inconsistent states that can arise due to inconsistent ordering of replication of load history EP files and files from the internal stage 155. In order to keep track of inconsistencies between files of the internal stage 175 and the corresponding load history EP file replication, the computing platform 110W may include a slice (called e.g., INVALID_STAG- E_TO_TABLE) and the computing platform 110E may include a corresponding slice (called e.g., INVALID_STAGE_TO_TABLE) which may be used to track the replication of the files of the internal stage 155 and the corresponding load history EP files. The replication logic 190 may then check if the internal stage 155 is in the INVALID_STAGE_TO_TABLE slice of the computing platform 110W's local metadata store. If it is, the replication logic 190 may put the corresponding mapped internal stage 175 and corresponding tables in the INVALID_STAGE_TO_TABLE_SECONDARY slice of computing platform 110E's local metadata store and may clear the INVALID_STAGE_TO_TABLE slice of computing platform 110W's metadata store. For each of the externally originating files within the internal stage 175, the replication logic 190 may add a first entry in the mapping 220 with the mapping of the local file path to the original file path and add a second entry in the mapping 220 with the mapping of the local content key to the original content key.

During the table and load history EP file replication, the replication logic 190 may use the mapping 220 to modify the file paths and content keys of the replicated load history EP files in the load history 180. More specifically, while replicating the load history EP files, for each of the load history EP files, the replication logic 190 may check if the corresponding internal stage (internal stage 175 in this example) has been replicated. If the corresponding internal stage 175 has not been replicated, the replication logic 190 may put the internal stage 175 and corresponding table in the "INVALID_STAGE_TO_TABLE" slice in the local metadata storage in computing platform 110W.

If the corresponding internal stage 175 has been replicated, the replication logic 190 may obtain the mapping of local file-level metadata to original file-level metadata for each file replicated to the internal stage 175 from the mapping 220 in the location 210. The replication logic 190 may use the mappings to modify the file paths and file content keys of the replicated load history EP files in the load history 180 to ensure that the replicated load history EP files contain correct (i.e., original) file-level metadata for the replicated files in the internal stage 175.

If the replication logic 190 locates any file for which it does not find corresponding entries in the mapping 220 when the mapping 220 is otherwise generally available, this means the internal stage 175 has been replicated but this particular external file has not been replicated yet. The replication logic 190 may again put the internal stage 175 and corresponding table in the INVALID_STAGE_TO_TABLE slice in the metadata store of computing platform 110W. The replication logic 190 may check all entries in the INVALID_STAGE_TO_TABLE_SECONDARY slice in the local metadata store of computing platform 110E for the internal stage 175 and corresponding table pair and clear each entry for which there is no corresponding entry in the INVALID_STAGE_TO_TABLE slice of the metadata store of computing platform 110W.

During a copy operation of the replication process, the replication logic 190 may check if the internal stage 175 and corresponding table pair is in the INVALID_STAGE_TO_TABLE_SECONDARY slice in the local metadata store of computing platform 110E. If it is, the replication logic 190 may fail the query as having a clear user error and provide a recommendation to refresh the directory table 170 again. This is because there could be some load history EP files replicated without transformation since the corresponding file of the internal stage 175 was not yet replicated at the time of load history EP file replication.

If not, no additional logic changes are required for the deduplication logic. It should be noted that instead of modifying existing load history EP files, the replication logic 190 may instead add new EP files with the original file paths and content keys. Adding new EP files may be beneficial for multi-location storage integration replication because it will add extra EP files to cover each of the locations. If the EP files have the original file paths and content keys, then during the copy operation, the deduplication logic does not need to be modified.

In another embodiment, the tables and corresponding load history EP files are replicated before the internal stage 155 and its contents are replicated. The computing platform 110E may maintain (in the location 210) the mapping 220 of local file paths and content keys to original file paths and content keys for each corresponding externally originating file as discussed hereinabove. After the internal stage 155 and its contents are replicated to the computing platform 110E, the computing platform 110E may obtain all the load history EP files from the load history 180 which have entries in the mapping 220 corresponding to any of the files replicated to the internal stage 175. For each of the files replicated to the internal stage 175, the replication logic 190 may use the mapping 220 to modify the file paths and file content keys of the replicated load history EP files in the load history 180 to ensure that the replicated load history EP files contain correct (i.e., original) file-level metadata for the replicated files in computing platform 110E.

In some embodiments, the replication logic 190 may affect a load history EP file transformation using the directory table 170 as the mapping. More specifically, the directory table 170 may be modified to include a hidden column for storing the original file content key (global). This hidden column will be empty for files that originate on the computing platform 110E. If a file is created by replication, the computing platform 110E may populate the hidden column. If a file has its original content key populated in the hidden column of the corresponding entry, it will always be used for subsequent replication.

The hidden column may be populated during replication of the content of internal stage 175. As well, during replication of the content of internal stage 175, the computing platform 110E may clear all entries for this stage in the INVALID_STAGE_TO_TABLE slice of the local metadata store of computing platform 110W. During table replication when the history EP files are being replicated, for each external file among the load history EP files, the computing platform 110E may check if the hidden column has a mapping for the original file content key. If the hidden column does not have the mapping, the computing platform 110E may put the internal stage 175 and corresponding table in the INVALID_STAGE_TO_TABLE slice in the local metadata store of computing platform 110W. If the hidden column does have the mapping, the computing platform 110E may obtain the mapping of file path and content key and use it to modify the file paths and file content keys in the replicated EP files to ensure that the replicated history EP files contain information about replicated external files within the computing platform 110E.

During a copy operation, the computing platform 110E may check if the stage and table pair is in the INVALID_STAGE_TO_TABLE slice in the local metadata store of computing platform 110W. If so, the computing platform 110E may fail the query as having a clear user error and provide a recommendation to refresh the table again. If not, no additional logic changes are required for the deduplication calculation.

Figure 6:
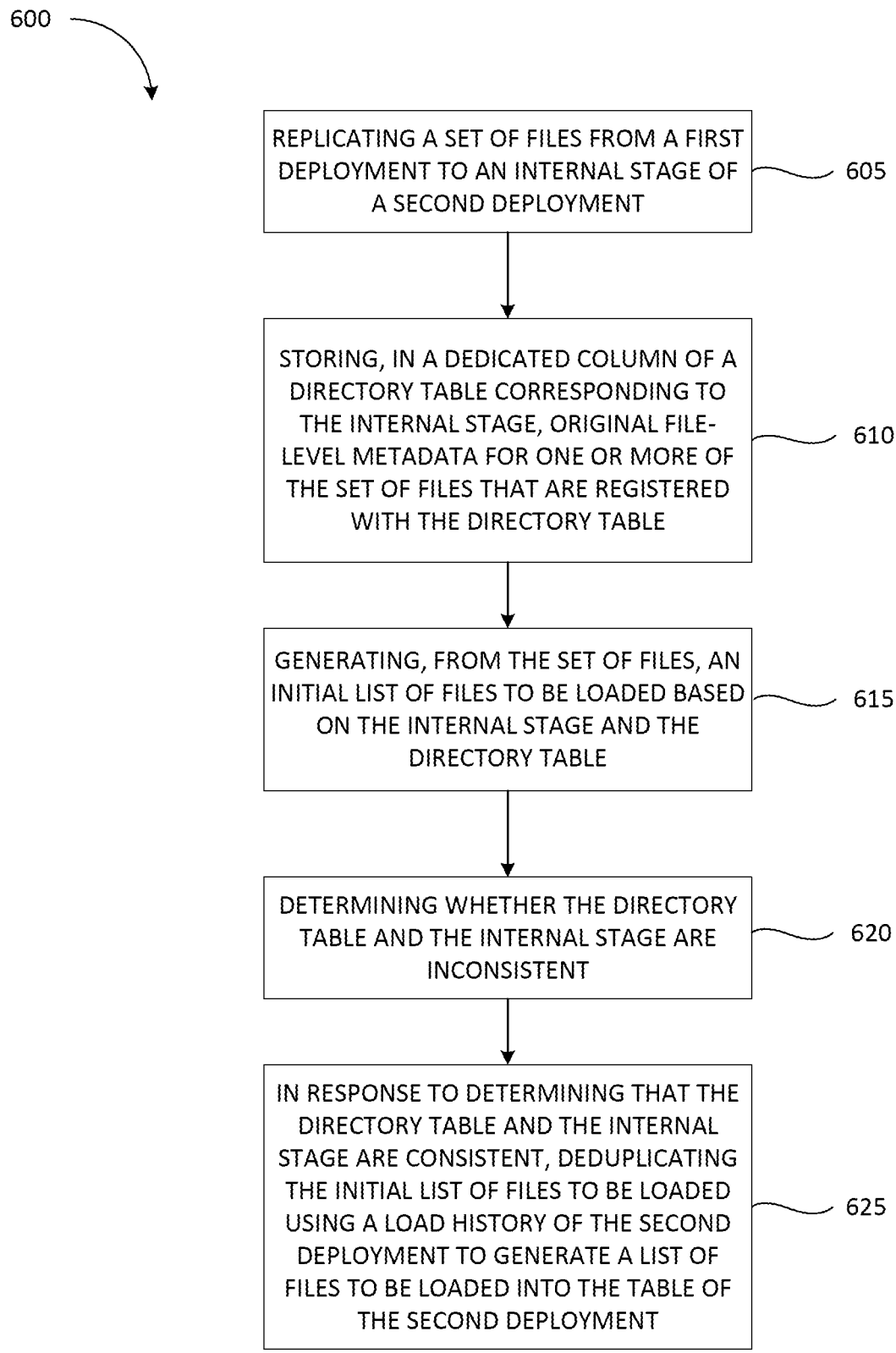
FIG. 6 illustrates a method for performing a deduplication operation using a modified directory table, in accordance with some embodiments of the present disclosure.

FIG. 6 is a flow diagram of a method 600 for using a directory table on an internal stage as a cache for storing and retrieving original file-level metadata (original file path, original content key etc.) for replicated files within the internal stage during a deduplication phase of a replication operation, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by computing platforms 110W and 110E (illustrated in FIGS. 3 and 4).

Referring also to FIG. 3, at block 605, as files F1, F2, and F3 are files replicated from computing platform 110W to computing platform 110E, the computing platform 110W may embed user-defined file-level metadata within in the files F1, F2, and F3 (e.g., (f1, ck1), (f2, ck2), (f3, ck3)). This user-defined metadata may be replicated to the internal stage 175 along with the files F1, F2, and F3 and may serve as an ultimate source of truth regarding the original file-level metadata of the replicated files. Stated differently, files F1', F2' and F3' stored in the internal stage 175 may also include this use-defined file-level metadata. Files F1', F2' have been replicated and registered with the directory table 170 and file F3' has been replicated but not yet registered in the directory table 170 (i.e., has leaked). File F4 is a new file created in computing platform 110E and has not yet been registered in directory table 170. As shown in FIG. 3, the directory table 170 may be modified to include an additional column 171 for storing the original file-level metadata (e.g., original file path and original content key) of each new file. The additional column 171 may comprise a single variant column to contain all the required original file-level metadata. However, in some embodiments the additional column 171 may comprise multiple columns, each dedicated to storing a particular aspect of the original file-level metadata. For files that are replicated to computing platform 110E, the additional column 171 will be populated with the original file-level metadata from the source deployment (e.g., computing platform 110W). More specifically, during internal stage content replication, at block 610 the computing platform 110E may store the original file-level metadata of each file being replicated as user-defined object metadata within the additional column 171. For new files that are created on computing platform 110E (i.e., files that were not replicated to computing platform 110E), the original file-level metadata stored in the additional column 171 will be the same as the local (e.g., computing platform 110E) file-level metadata. As can be seen in FIG. 3, (f1', ck1') indicates the local file path and content key respectively for replicated file F1' and not the original file path and content key (which should be f1, ck1 respectively). Because files F1' and F2' have been registered with the directory table 170, their local file-level metadata ((f1', ck1') and (f2', ck2') respectively) is stored in the directory table 170 and their original file-level metadata ((f1, ck1) and (f2, ck2) respectively) has been stored in the additional column 171 of the directory table 170. Because files F3' and F3 have not yet been registered in the directory table 170, the directory table 170 contains none of their file-level metadata (whether original or local).

During the deduplication phase of the copy operation, at block 615 the computing platform 110E may prepare the initial list of candidate files to be loaded to the table 190 based on the files listed in the internal stage 175 and a directory table 170 lookup as discussed in further detail herein. After determining the initial list of candidate files to be loaded based on the contents of the internal stage 175 and the contents of the directory table 170, at block 620 the computing platform 110E may determine whether the list of files registered in the directory table 170 is inconsistent with the files listed in the internal stage 175.

The stage DPO (not shown) of computing platform 110E may include an inconsistency flag (hereinafter referred to as a "Stage DPO flag") which may be set after the first refresh of the directory table 170 after a failover as discussed hereinabove. The Stage DPO flag may be used by the computing platform 110E to determine whether the files registered with the directory table 170 are inconsistent with the files listed in the internal stage 175 (i.e., the reliability of the directory table 170). At block 625, if the Stage DPO flag is not set, the computing platform 110E may know that the files registered with the directory table 170 are consistent with the files listed in the internal stage 175 (because none of the original file-level metadata has been lost to a refresh) and the copy operation can use the directory table 170 to generate the final list of candidate files to be loaded. If the Stage DPO flag is set, the computing platform 110E may determine that a first refresh of the directory table 170 has occurred after a failover which indicates that there are potentially leaked files (i.e., the files registered with the directory table 170 are potentially inconsistent with the files listed in the internal stage 175) and that a refresh of the directory table 170 is needed to make the directory table 170 and the internal stage 175 consistent.

If the Stage DPO flag is set, it will remain set until the subsequent refresh of the directory table 170. For copy queries loading from the internal stage 175 while the Stage DPO flag is set and before the subsequent refresh of the directory table 170, the computing platform 110E will inspect the user-defined file-level metadata from the internal stage 175 to obtain the original file-level metadata for each file of the initial list of candidate files that is present in the internal stage 175 but not in the directory table 170. The computing platform 110E may modify the file descriptors for each file of the initial list of candidate files that is present in the internal stage 175 but not in the directory table 170 by replacing the local file-level metadata with the original file-level metadata obtained from the internal stage 175 to generate the final list of candidate files to be loaded. The computing platform 100E may then perform deduplication using the final list of candidate files and the load history 180.

During the subsequent refresh of the directory table 170, for each file that is present in the internal stage 175 but not in the directory table 170, the computing platform 110E may inspect the corresponding user-defined file-level metadata from the internal stage 175 and use it to update the corresponding entry of the additional column 171 by replacing the local file-level metadata with the original file-level metadata obtained from the internal stage 175. The Stage DPO flag may then be unset and for copy queries loading from the internal stage 175, the computing platform 110E can use the directory table 170 to generate the final list of candidate files to be loaded.

In some embodiments, instead of a flag, the Stage DPO may provide for a timestamp of a first refresh after a failover to be stored. In such embodiments, when determining whether the contents of the directory table 170 are consistent with the internal stage 175, the computing platform 110E may determine whether a first refresh time stamp has been set in the Stage DPO (not shown). If no timestamp has been set, the computing platform 110E may know that the contents of the directory table 170 is consistent with the internal stage 175 and the copy operation can use the directory table 170 to generate the list of candidate files to be loaded. If a timestamp is set, the computing platform 110E may determine that a first refresh has occurred after a failover and thus that there are potentially leaked files. As a result, the computing platform 110E will be required to inspect the user-defined file-level metadata from the internal stage 175 for each file that is present in the internal stage 175 but not in the directory table 170 until the subsequent refresh of the directory table 170, as discussed above.

At this point, the computing platform 110E may perform standard deduplication techniques (e.g., using the load history 180) on the final list of candidate files to determine which files from the final list should be loaded into table 190. It should be noted that this approach may incur potentially long file listing times that result in copy performance degradation for a number of copy queries. However, it allows the system to ensure that the copy behavior remains consistent.

Figure 7:
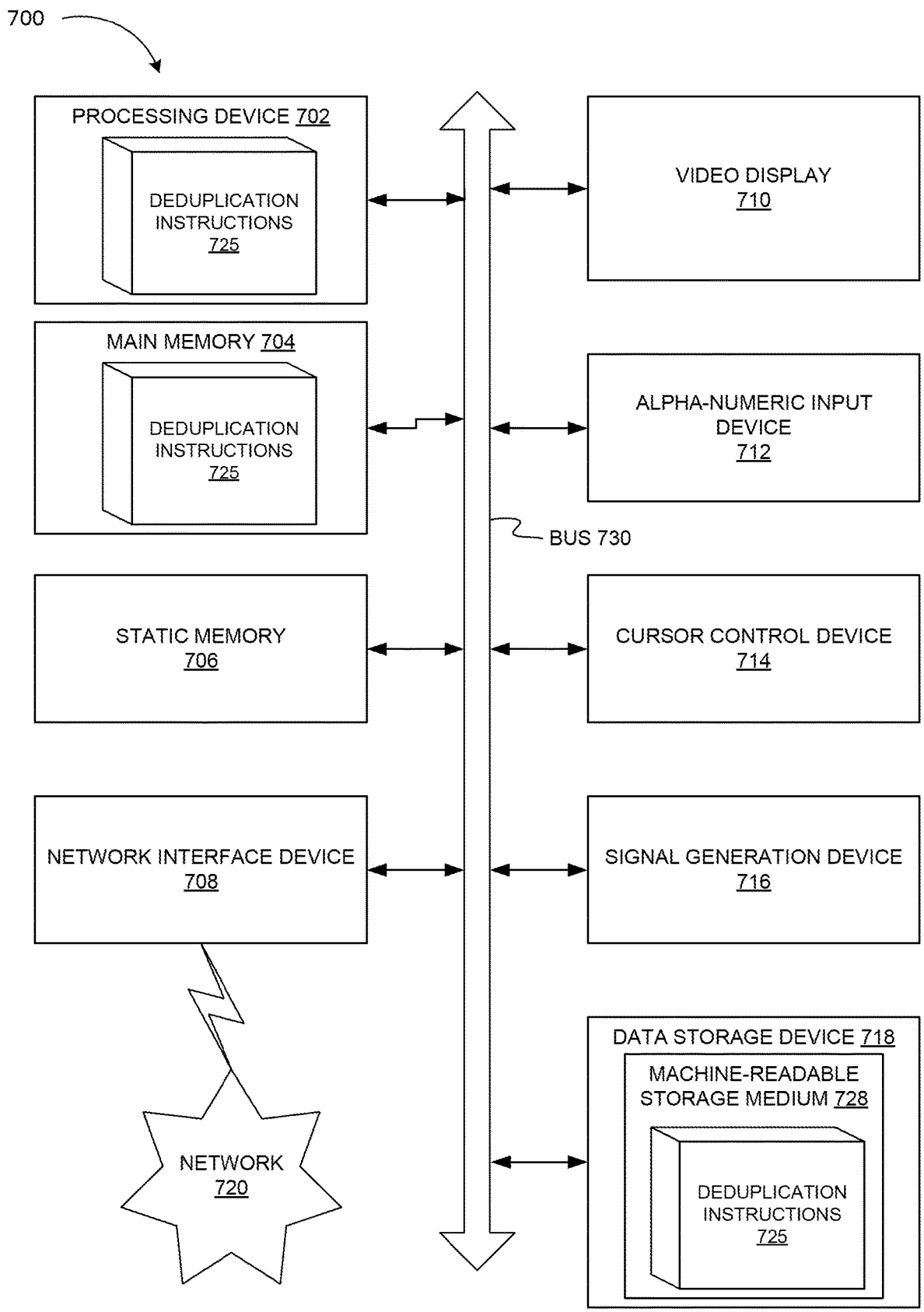
FIG. 7 is a block diagram of an example computing device that may perform one or more of the operations described herein, in accordance with some embodiments of the present disclosure.

FIG. 7 illustrates a diagrammatic representation of a machine in the example form of a computer system 700 within which a set of instructions, for causing the machine to perform any one or more of the methodologies discussed herein for deduplicating files that are replicated as part of an internal stage replication process. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 700 may further include a network interface device 708 which may communicate with a network 720. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse) and an acoustic signal generation device 716 (e.g., a speaker). In one embodiment, video display unit 710, alphanumeric input device 712, and cursor control device 714 may be combined into a single component or device (e.g., an LCD touch screen).

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute deduplication instructions 725, for performing the operations and steps discussed herein.

The data storage device 718 may include a machine-readable storage medium 728, on which is stored one or more sets of deduplication instructions 725 (e.g., software) embodying any one or more of the methodologies of functions described herein. The deduplication instructions 725 may also reside, completely or at least partially, within the main memory 704 or within the processing device 702 during execution thereof by the computer system 700; the main memory 704 and the processing device 702 also constituting machine-readable storage media. The deduplication instructions 725 may further be transmitted or received over a network 720 via the network interface device 708.

The machine-readable storage medium 728 may also be used to store instructions to perform a method for determining functions to compile, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud). The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
as a set of files are replicated from a first deployment to an internal stage of a second deployment, embedding user-defined file-level metadata in each of the set of files, the user-defined file-level metadata of each file corresponding to original file-level metadata of the file;
storing, in a dedicated column of a directory table corresponding to the internal stage, the original file-level metadata for one or more of the set of files that are registered with the directory table;
generating, from the set of files, an initial list of files to be loaded into a table of the second deployment based on the internal stage and the directory table;
determining, by a processing device, whether the directory table and the internal stage are consistent; and
in response to determining that the directory table and the internal stage are consistent, deduplicating the initial list of files to be loaded using a load history of the second deployment to generate a list of files to be loaded into the table of the second deployment.

2. The method of claim 1, wherein generating the initial list of files to be loaded comprises:
including in the list, local file-level metadata for each of the set of files replicated to the internal stage;
performing a lookup of the directory table to determine the original file-level metadata for each of the one or more files that are registered with the directory table; and
for each of the one or more registered files, replacing the local file-level metadata in the initial list with the original file-level metadata.

3. The method of claim 2, further comprising:
in response to determining that the directory table and the internal stage are not consistent:
if a subsequent refresh of the directory table has not occurred, for each of the set of files that is present in the internal stage but not in the directory table, looking up the original file-level metadata of the file from the user-defined file-level metadata stored in the internal stage;
for each of the set of files that is present in the internal stage but not in the directory table, replacing in the initial list of files to be loaded, the local file-level metadata of the file with the original file-level metadata of the file; and
deduplicating the initial list of files to be loaded using a load history of the second deployment.

4. The method of claim 3, further comprising:
if a subsequent refresh of the directory table has occurred, for each of the set of files that is present in the internal stage but not in the directory table, updating a corresponding entry in the dedicated column of the directory table with the original file-level metadata of the file from the user-defined file-level metadata stored in the internal stage.

5. The method of claim 1, wherein determining whether the directory table and the internal stage are consistent comprises:
determining whether a first refresh of the directory table has occurred since the replication of the set of files from the first deployment to the internal stage of the second deployment.

6. The method of claim 5, wherein the determination of whether the first refresh of the directory table has occurred since the replication of the set of files is based on a status of a flag in a stage data persistence object (DPO) of the second deployment.

7. The method of claim 5, wherein the determination of whether the first refresh of the directory table has occurred since the replication of the set of files is based on a timestamp of a most recent refresh of the directory table in a stage DPO of the second deployment.

8. The method of claim 1, wherein:
the local file-level metadata of a file of the set of files comprises:
a file path of the file associated with the second deployment; and
a content key of the file associated with the second deployment; and
the original file-level metadata of the file comprises:
a file path of the file associated with the original deployment; and
a content key of the file associated with the original deployment.

9. A system comprising:
a memory; and
a processing device operatively coupled to the memory, the processing device to:
as a set of files are replicated from a first deployment to an internal stage of a second deployment, embed user-defined file-level metadata in each of the set of files, the user-defined file-level metadata of each file corresponding to original file-level metadata of the file;
store, in a dedicated column of a directory table corresponding to the internal stage, the original file-level metadata for one or more of the set of files that are registered with the directory table;
generate, from the set of files, an initial list of files to be loaded into a table of the second deployment based on the internal stage and the directory table;
determine whether the directory table and the internal stage are consistent; and
in response to determining that the directory table and the internal stage are consistent, deduplicate the initial list of files to be loaded using a load history of the second deployment to generate a list of files to be loaded into the table of the second deployment.

10. The system of claim 9, wherein to generate the initial list of files to be loaded, the processing device is to:
include in the list, local file-level metadata for each of the set of files replicated to the internal stage;
perform a lookup of the directory table to determine the original file-level metadata for each of the one or more files that are registered with the directory table; and
for each of the one or more registered files, replace the local file-level metadata in the initial list with the original file-level metadata.

11. The system of claim 10, wherein the processing device is further to:
in response to determining that the directory table and the internal stage are not consistent:
if a subsequent refresh of the directory table has not occurred, for each of the set of files that is present in the internal stage but not in the directory table, look up the original file-level metadata of the file from the user-defined file-level metadata stored in the internal stage;
for each of the set of files that is present in the internal stage but not in the directory table, replace in the initial list of files to be loaded, the local file-level metadata of the file with the original file-level metadata of the file; and
deduplicate the initial list of files to be loaded using a load history of the second deployment.

12. The system of claim 11, wherein the processing device is further to:
if a subsequent refresh of the directory table has occurred, for each of the set of files that is present in the internal stage but not in the directory table, update a corresponding entry in the dedicated column of the directory table with the original file-level metadata of the file from the user-defined file-level metadata stored in the internal stage.

13. The system of claim 9, wherein to determine whether the directory table and the internal stage are consistent, the processing device is to:
determine whether a first refresh of the directory table has occurred since the replication of the set of files from the first deployment to the internal stage of the second deployment.

14. The system of claim 13, wherein the processing device determines whether the first refresh of the directory table has occurred since the replication of the set of files based on a status of a flag in a stage data persistence object (DPO) of the second deployment.

15. The system of claim 13, wherein the processing device determines whether the first refresh of the directory table has occurred since the replication of the set of files based on a timestamp of a most recent refresh of the directory table in a stage DPO of the second deployment.

16. The system of claim 9, wherein:
the local file-level metadata of a file of the set of files comprises:
a file path of the file associated with the second deployment; and
a content key of the file associated with the second deployment; and
the original file-level metadata of the file comprises:
a file path of the file associated with the original deployment; and
a content key of the file associated with the original deployment.

17. A non-transitory computer-readable medium having instructions stored thereon which, when executed by a processing device, cause the processing device to:
as a set of files are replicated from a first deployment to an internal stage of a second deployment, embed user-defined file-level metadata in each of the set of files, the user-defined file-level metadata of each file corresponding to original file-level metadata of the file;
store, in a dedicated column of a directory table corresponding to the internal stage, the original file-level metadata for one or more of the set of files that are registered with the directory table;
generate from the set of files, an initial list of files to be loaded into a table of the second deployment based on the internal stage and the directory table;
determine, by the processing device, whether the directory table and the internal stage are consistent; and
in response to determining that the directory table and the internal stage are consistent, deduplicate the initial list of files to be loaded using a load history of the second deployment to generate a list of files to be loaded into the table of the second deployment.

18. The non-transitory computer-readable medium of claim 17, wherein to generate the initial list of files to be loaded, the processing device is to:
include in the list, local file-level metadata for each of the set of files replicated to the internal stage;
perform a lookup of the directory table to determine the original file-level metadata for each of the one or more files that are registered with the directory table; and
for each of the one or more registered files, replace the local file-level metadata in the initial list with the original file-level metadata.

19. The non-transitory computer-readable medium of claim 18, wherein the processing device is further to:
in response to determining that the directory table and the internal stage are not consistent:
if a subsequent refresh of the directory table has not occurred, for each of the set of files that is present in the internal stage but not in the directory table, look up the original file-level metadata of the file from the user-defined file-level metadata stored in the internal stage;
for each of the set of files that is present in the internal stage but not in the directory table, replace in the initial list of files to be loaded, the local file-level metadata of the file with the original file-level metadata of the file; and
deduplicate the initial list of files to be loaded using a load history of the second deployment.

20. The non-transitory computer-readable medium of claim 19, wherein the processing device is further to:
if a subsequent refresh of the directory table has occurred, for each of the set of files that is present in the internal stage but not in the directory table, update a corresponding entry in the dedicated column of the directory table with the original file-level metadata of the file from the user-defined file-level metadata stored in the internal stage.

21. The non-transitory computer-readable medium of claim 17, wherein to determine whether the directory table and the internal stage are consistent, the processing device is to:
determine whether a first refresh of the directory table has occurred since the replication of the set of files from the first deployment to the internal stage of the second deployment.

22. The non-transitory computer-readable medium of claim 21, wherein the processing device determines whether the first refresh of the directory table has occurred since the replication of the set of files based on a status of a flag in a stage data persistence object (DPO) of the second deployment.

23. The non-transitory computer-readable medium of claim 21, wherein the processing device determines whether the first refresh of the directory table has occurred since the replication of the set of files based on a timestamp of a most recent refresh of the directory table in a stage DPO of the second deployment.

24. The non-transitory computer-readable medium of claim 17, wherein:
the local file-level metadata of a file of the set of files comprises:
a file path of the file associated with the second deployment; and
a content key of the file associated with the second deployment; and
the original file-level metadata of the file comprises:
a file path of the file associated with the original deployment; and
a content key of the file associated with the original deployment.

* * * * *